US010610915B2

(12) United States Patent
Zelle et al.

(10) Patent No.: US 10,610,915 B2
(45) Date of Patent: Apr. 7, 2020

(54) COOLING CONVEYOR

(71) Applicant: PRIMETALS TECHNOLOGIES USA LLC, Alpharetta, GA (US)

(72) Inventors: Jason Zelle, Worcester, MA (US); William Shen, Boylston, MA (US); Matthew Palfreman, Charlton, MA (US)

(73) Assignee: Primetals Technologies USA LLC, Alpharetta, GA (US)

( * ) Notice: Subject to any disclaimer, the term of this patent is extended or adjusted under 35 U.S.C. 154(b) by 175 days.

(21) Appl. No.: 15/703,170

(22) Filed: Sep. 13, 2017

(65) Prior Publication Data

US 2019/0076898 A1    Mar. 14, 2019

(51) Int. Cl.
*B21B 45/02*    (2006.01)
*B65G 13/00*    (2006.01)
*B65G 49/00*    (2006.01)
*B05B 1/00*    (2006.01)
*B05B 13/02*    (2006.01)
*B05B 1/30*    (2006.01)

(52) U.S. Cl.
CPC ......... *B21B 45/0209* (2013.01); *B05B 1/005* (2013.01); *B05B 1/30* (2013.01); *B05B 13/0207* (2013.01); *B21B 2045/0212* (2013.01); *B65G 13/00* (2013.01); *B65G 49/00* (2013.01)

(58) Field of Classification Search
CPC ........ B21B 45/0209; B21B 2045/0212; B05B 1/005; B05B 13/0207; B05B 1/30; B65G 49/00; B65G 13/00
See application file for complete search history.

(56) References Cited

U.S. PATENT DOCUMENTS

| | | | | |
|---|---|---|---|---|
| 5,070,627 | A * | 12/1991 | Zagar | F26B 13/10 34/633 |
| 5,871,596 | A * | 2/1999 | Kiefer | C21D 9/5732 148/601 |
| 9,322,594 | B2 * | 4/2016 | Bruckner | F26B 15/12 |
| 2014/0261905 | A1 * | 9/2014 | Blejde | B22D 11/0622 148/541 |

* cited by examiner

*Primary Examiner* — Jessica Yuen
(74) *Attorney, Agent, or Firm* — Gesmer Updegrove LLP

(57) ABSTRACT

A system for cooling rolling mill material is provided that includes a conveyor system that receives rolling mill material and passes the rolling mill material through one or more cooling regions. A cooling structure that operates uniformly across the central and edge regions of the conveyor system. The cooling structure uses a first jet of air for cooling the central portion of the rolling mill material. A nozzle deck is positioned on the edge regions of the conveyor system produces a second jet of air for cooling the edge portions of the rolling mill. The nozzle deck includes one or more adjustable nozzle structures for controlling the air flow produced by the second jet of air by varying the size of their air passage regions.

8 Claims, 6 Drawing Sheets

COOLING CONVEYOR

BACKGROUND OF THE INVENTION

The invention is related to the field of cooling conveyors, and in particular to a flexible nozzle deck for cooling conveyors with process optimizations.

In a conventional rolling mill installation, hot rolled steel rod emerges from the last roll stand of the mill at a temperature of about 750°-1100° C. The rod is then rapidly water-quenched down to about 550°-1000° C. in a series of water boxes before being directed by driven pinch rolls to a laying head. The laying head forms the rod into a continuous series of rings which are deposited on a cooling conveyor. The conveyor has driven table rollers which carry the rings in a non-concentric overlapping pattern through one or more cooling zones. The conveyor has a deck underlying the rollers. The deck is interrupted by slots or nozzles through which a gaseous cooling medium, typically ambient air, is directed upwardly between the rollers and through the rings being transported thereon. The cooling air is driven by fans connected to the nozzles via plenum chambers. The thus cooled rings drop from the delivery end of the conveyor into a reforming chamber where they are gathered into upstanding coils.

The non-concentric overlapping ring pattern has a greater density along edge regions of the conveyor as compared to the density at a central region of the conveyor. Therefore, a greater amount of air is directed to the edge regions of the conveyor to compensate for the greater density of metal at those regions. Typically, this is achieved by increasing the nozzle or slot area at the edge regions. This can be accomplished by locating short slots or nozzles at the edge regions between longer slots or nozzles which extend across the full conveyor width. Alternatively, full width nozzles or slots may be employed exclusively in conjunction with mechanical means such as vanes, dampers, etc. (not shown) in the plenum chambers to direct more air to the conveyor edge regions.

The cooling path through metallurgical transformation is a function of the air velocity and the amount of air (among other factors) applied to the rod. Thus, as the rod is conveyed by the table rollers over successive mutually spaced slots or nozzles, the resulting intervals between coolant applications produce a stepped cooling path.

With a greater number of coolant applications at the edge regions as compared to the central region, the non-uniform intervals between successive coolant applications will result in one cooling path at the edge regions and a different cooling path at the central region. These different cooling paths cause different rod segments to pass through transformation at different temperatures and at different rates, resulting in non-uniform metallurgical properties along the length the rod.

A related disadvantage of conventional air distribution systems is the "hard" transition from high air velocities at the conveyor edge regions to lower air velocities at the central region. Where different numbers of nozzles are located at the edge and central conveyor regions, the edge nozzles supply air only over a discrete portion of the total width of the steel rings being cooled. There is a sudden change from intense air cooling to no air cooling at the transition between the edge and the central regions. In the case of nozzles which span the entire width of the conveyor as used in conjunction with vanes or dampers to direct more flow to the edges, there is also a "hard" transition from high flow at the edges to lower flow in the center. This is a result of the presence of dividers in the plenum chamber upstream of the nozzles, which channel the air from the fans to the nozzles.

In other prior art systems apply cooling air to all ring segments at regularly spaced intervals, coupled with a decrease in the air flow rate at the central region of the conveyor, where ring density is lower than that at the conveyor edge regions.

SUMMARY OF THE INVENTION

According to one aspect of the invention, there is provided a system for cooling rolling mill material. The system includes a conveyor system that receives rolling mill material and passes the rolling mill material through one or more cooling regions. A cooling structure that operates uniformly across the central and edge regions of the conveyor system. The cooling structure uses a first jet of air for cooling the central portion of the rolling mill material. A nozzle deck is positioned on the edge regions of the conveyor system produces a second of jet of air for cooling the edge portions of the rolling mill. The nozzle deck includes one or more adjustable nozzle structures for controlling the air flow produced by the second jet of air by varying the size of their air passage regions.

According to another aspect of the invention, there is provided a method of cooling rolling mill material. The method includes receiving rolling mill material and passes the rolling mill material through one or more cooling regions using a conveyor system. A cooling structure is provided that operates uniformly across the central and edge regions of the conveyor system. The cooling structure uses a first jet of air for cooling the central portion of the rolling mill material. Moreover, the method includes positioning on the edge regions of the conveyor system a nozzle deck that produces a second of jet of air for cooling the edge portions of the rolling mill. The nozzle deck includes one or more adjustable nozzle structures for controlling the air flow produced by the second jet of air by varying the size of their air passage regions.

According to another aspect of the invention, there is provided a nozzle deck for cooling rolling mill material. The nozzle deck includes one or more adjustable nozzle structures for controlling air flow to the rolling mill material by varying the size of their air passage regions.

DETAILED DESCRIPTION OF THE INVENTION

The present invention improves over commonly used cooling conveyors. The invention uses a fixed mesh that is employed to control air flow in the center section of a conveyor system where the ring pattern of the wire rod is usually at its least dense and cools the quickest. The outer edge of the conveyor system utilizes a fixed outer jet, provided by a nozzle deck, that are wider than those that are typically employed to allow the dense section of the coil to remain in the high flow area for a longer period of time. The nozzle deck includes a number of the nozzle structures designed to allow one to infinitely vary the maximum open and closed positions of the nozzle structures to control the direction of air flow and pressure across the remainder of the coil. The technique of adjustment being infinitely variable leads itself to be either manual or numerically controlled.

The nozzle deck and fan speeds can be controlled using a control system, such as a mechatronic package, where the control system can be coupled to pyrometers/thermal imagers along the cooling conveyor system to feed back the cooling rate of the conveyor system and adjust the air flow to the material by regulating the opening positions of each of the nozzle structures in the nozzle deck and the fan speeds. If pyrometers are not available the system could be used in conjunction with an eddy current transformation gauge.

Figure 1:
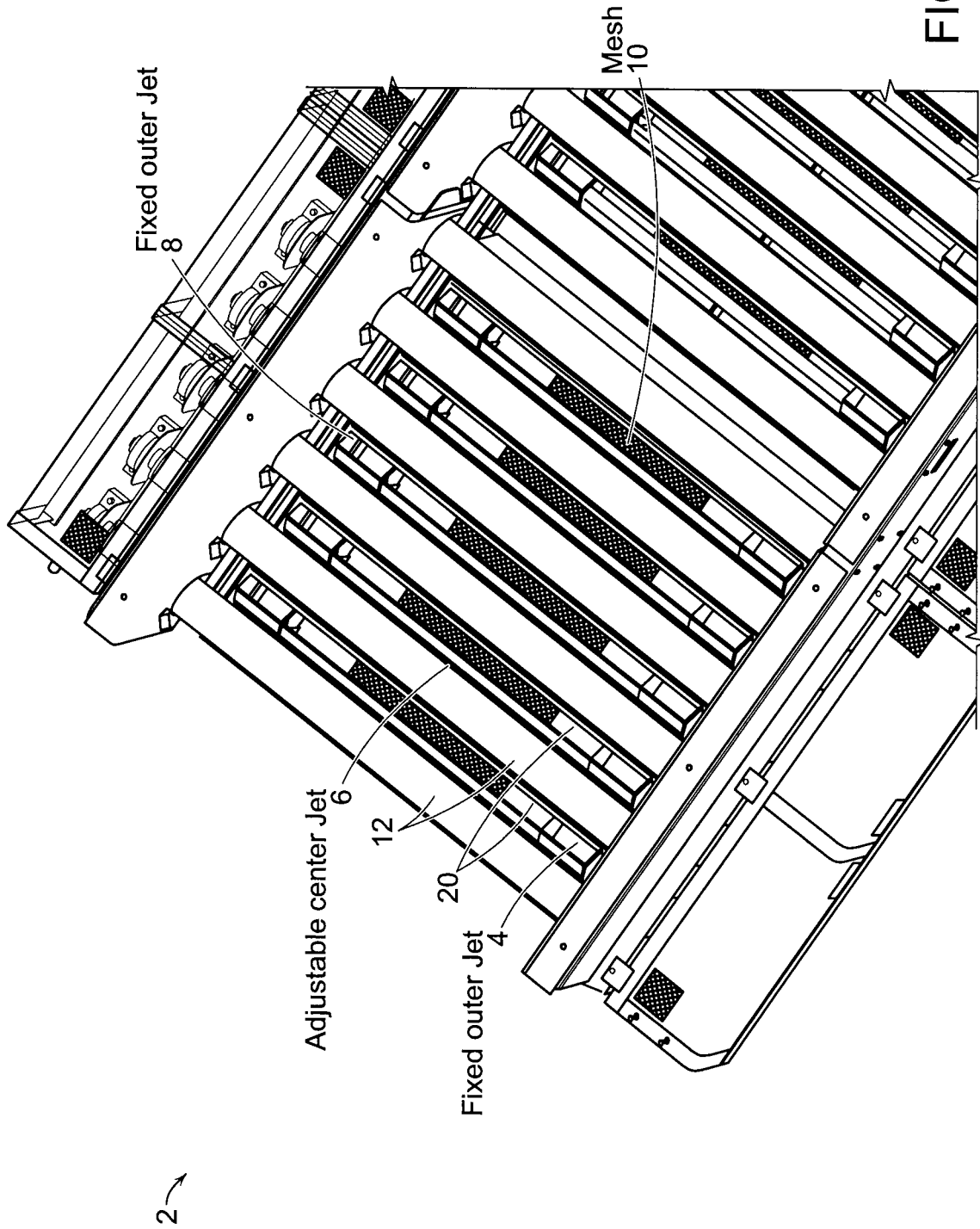
FIG. 1 is a schematic diagram illustrating a top view of the inventive conveyor system.

FIG. 1 shows a top view of the inventive conveyor system 2. The conveyor system 2 includes table rollers 12 which carry rings of rolling mill material through one or more cooling regions to cool the hot rolled steel rod. An adjustable center jet structure 6 extends along the central region beneath the conveyor system 2. The adjustable jet structure 6 can include a mesh material 10 that allows for air to be blown into the central region of the conveyor system 2 using a fan. The conveyor system 2 includes a fixed outer jet 4 produced in part by air being blown thru a nozzle deck 20 comprising a number of nozzle structures at the edge regions of the conveyor system 2.

By employing an adjustable center jet at the central region of the conveyor system 2, air flow through the regularly spaced openings in the mesh 10 is redistributed to provide the additional cooling required at the conveyor system's edge regions. The adjustable jet and fixed outer jet insure the rolling mill material at both the edge and central regions experience the same intervals between successive coolant applications. The cooling paths at the edge and central regions can be substantially identical, which in turn can produce more uniform metallurgical properties along the entire length of the rod.

Figure 2:
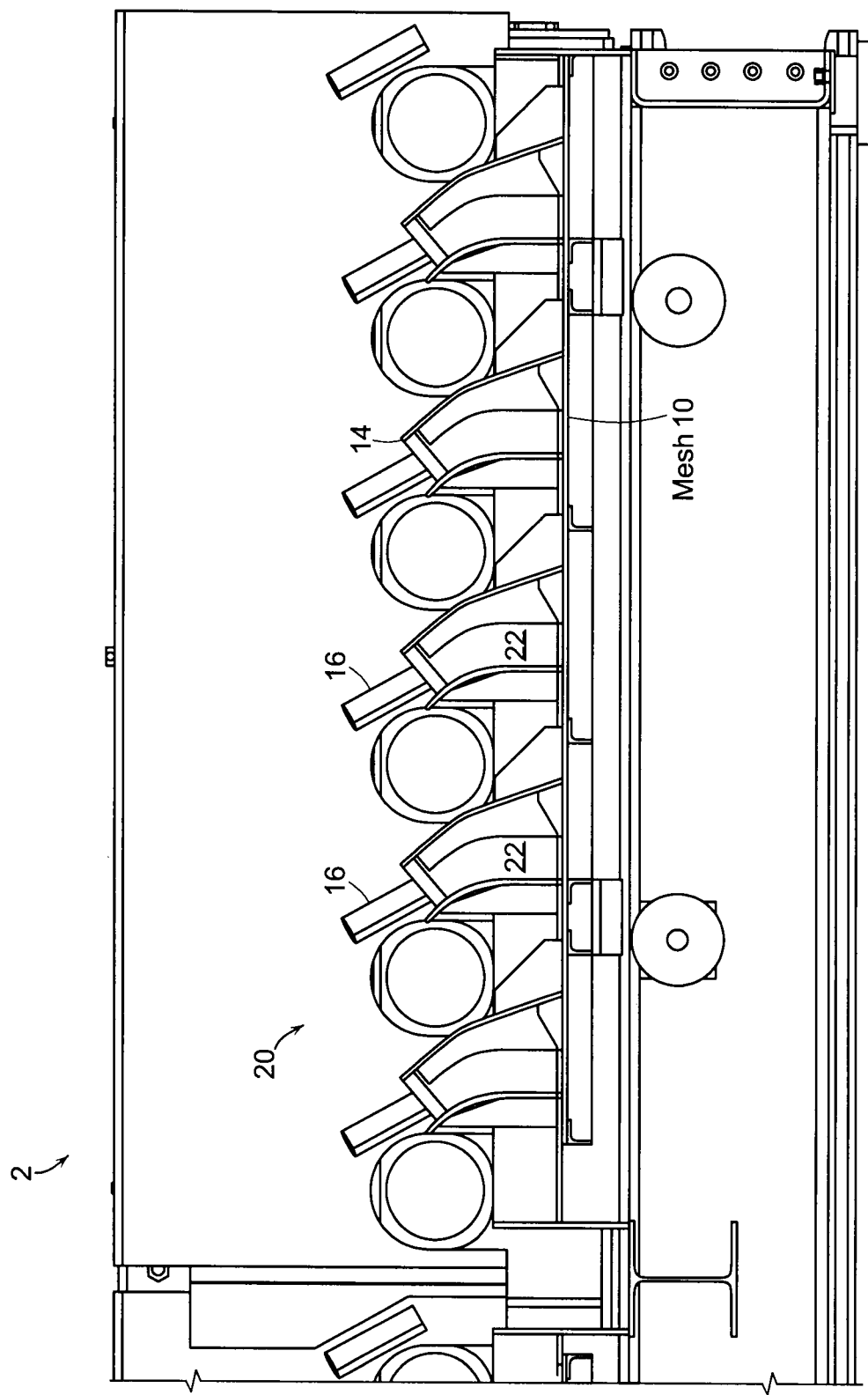
FIG. 2 is a schematic diagram illustrating a side view of the conveyor system including a novel nozzle deck used to produce the fixed outer jet.

FIG. 2 shows a side view of the conveyor system 2 including the nozzle deck 20 used to produce the fixed outer jet 4. The nozzle deck 20 includes a number of nozzle structures 16 that allow one to adjust air flow and pressure at the edge region by adjusting each nozzle structure's 16 exit area thru its central region 22 using a flap structure 14. Each nozzle structure 16 is designed to allow one to vary infinitely its maximum open and closed position so as to control air flow and pressure across the remainder of the rolling mill material. The adjustment of each nozzle structure's 16 central region 22 can be controlled manually or by a control system. The operations of the nozzle deck and fan speeds can be controlled from by a control system, such as a mechatronic package. The control system can be coupled to a number of pyrometers/thermal imagers to assess the cooling rate of the conveyor system 2 and controlling the air flow and pressure coming out of the fixed outer jet, the adjustable center jet, and the fan speeds of the conveyor system 2 so as to cool the rolling mill material simultaneously.

Figure 3:
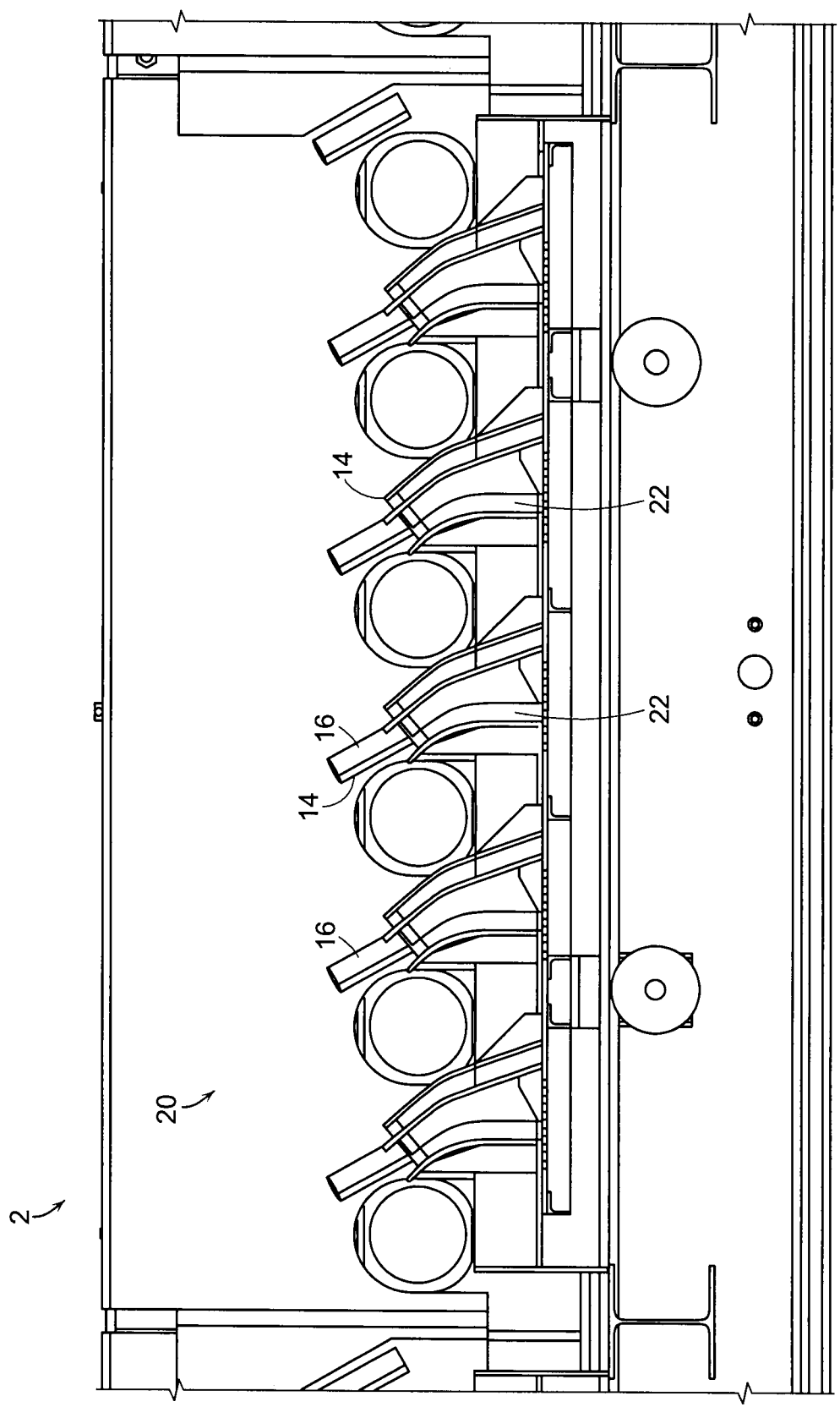
FIG. 3 is a schematic diagram illustrating adjusting a nozzle structure for controlling the fixed outer jet.

FIG. 3 shows a side view of the conveyor system 2 that illustrates adjusting the nozzle structure 16 for controlling the fixed outer jet. Note the central regions 22 of the nozzle structures 16 are adjusted to be in their closed positions reducing its exit area and lowering its air passage by moving the flap structure 14.

Figure 4:
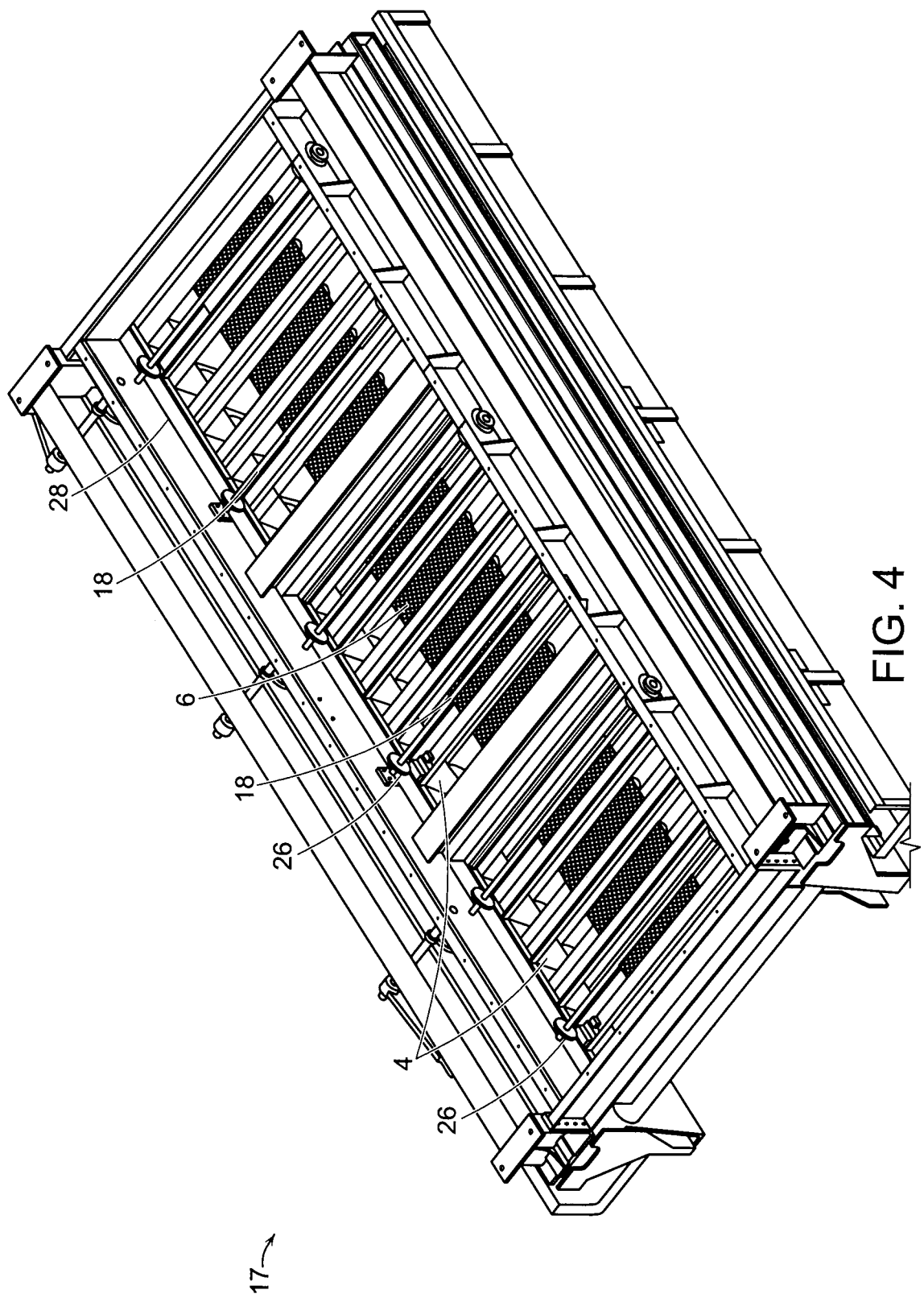
FIG. 4 is a schematic diagram illustrating one or more rack pinions to control the air flow of the adjustable center jet.

FIG. 4 shows the use of rack pinions 18 that control the air flow of the adjustable center jet. Both ends of the rack pinions 18 include wheels 26 that are positioned on a rail 28 on the conveyor system 17. The wheels 26 are allowed to move a rack pinion 18 so as to lower or increase air flow in a defined section of the adjustable center jet. The movement of each rack pinion 18 can be controlled manually or using a control system, such as a servo-motor.

Figure 5:
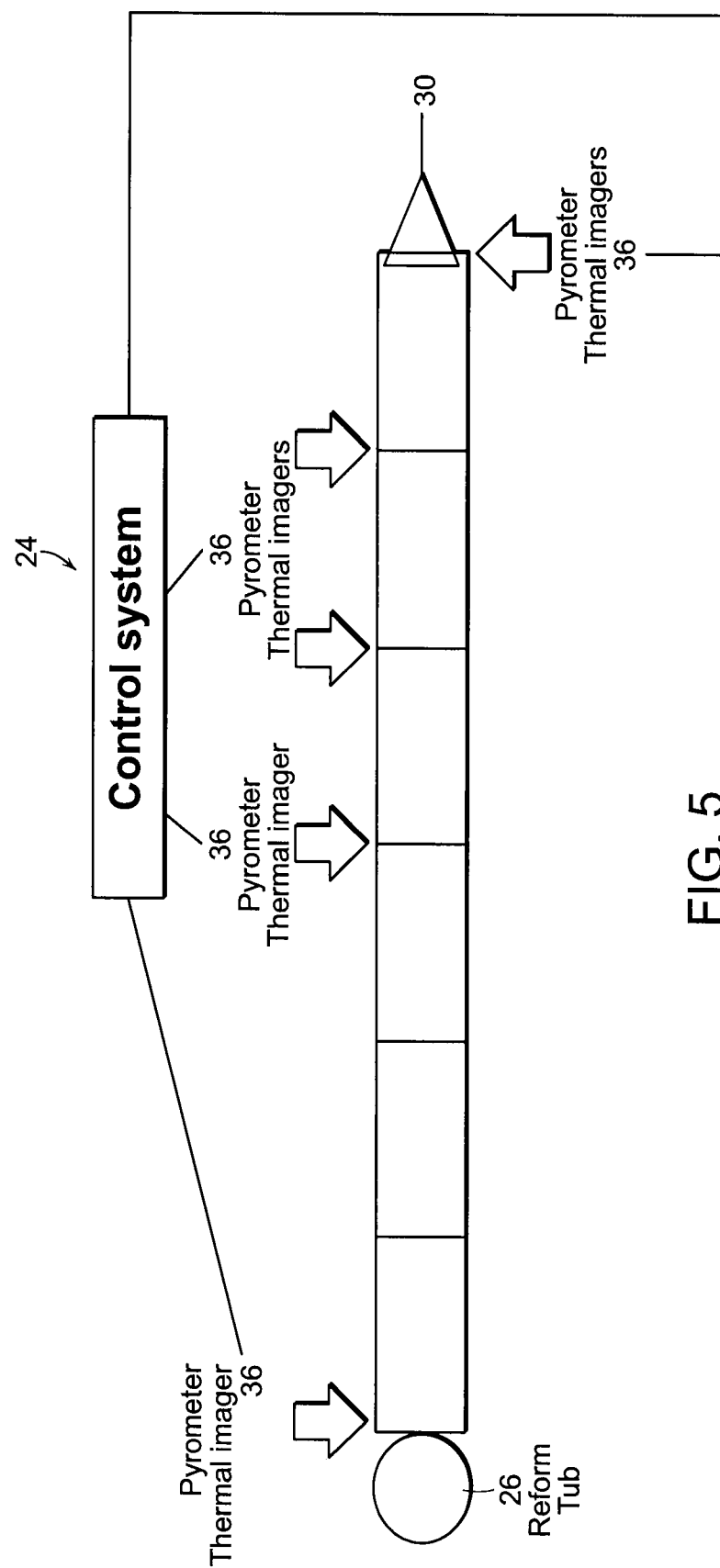
FIG. 5 is a schematic diagram illustrating a control system used by the invention to control the overall passage of air for cooling purposes.

FIG. 5 shows a control system 24 used by the invention to control the overall passage of air for cooling purposes. The control system 24 receives input signals from a number of pyrometers/thermal imagers 36 at various points on the conveyor system 32 from such locations as the reform tub 26 to the laying head 30. The control system 24 uses the information from the pyrometers 36 in an feedback arrangement so as to control the cooling rate of the conveyor system 32 and adjust the air flow and pressure to the rolling mill material by regulating the open and close positions of the nozzle structures, the movements of the rack pinions to control air flow from the adjustable center jet, and the fan speeds. The control system 24 can use predicted cooling rates by verifying the difference between the predicted and the actual temperatures of the conveyor system 32 and determine if adjustments in cooling are needed so the actual temperature of the conveyor system 32 is close to its predicted temperature.

Figure 6A:
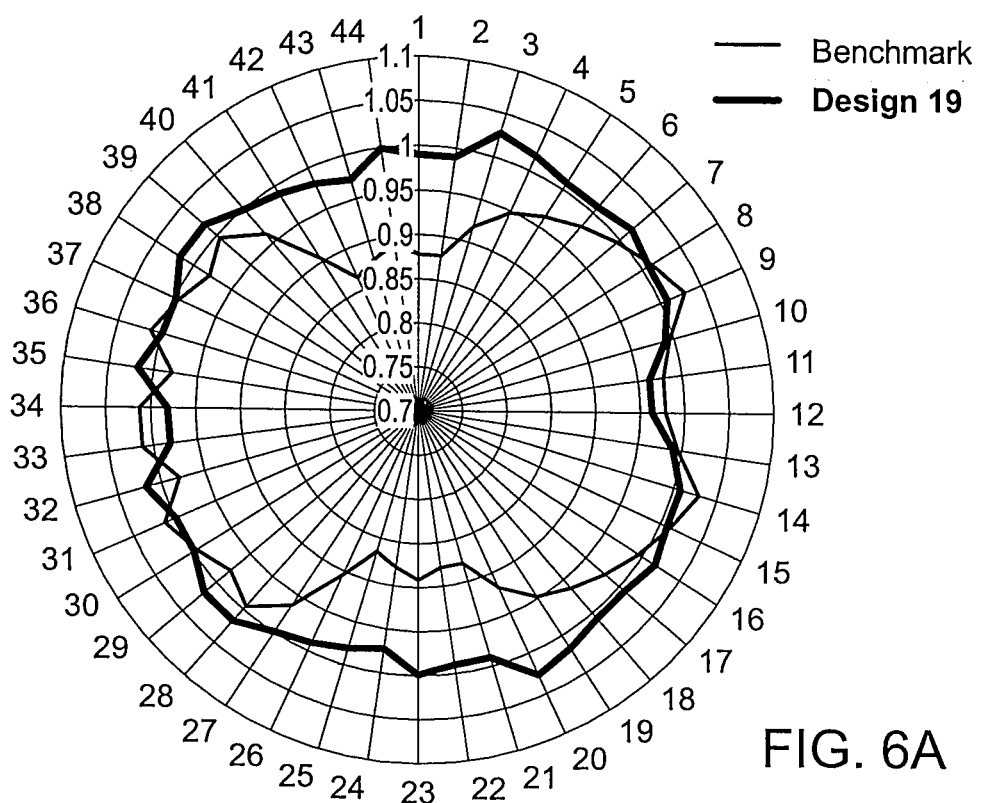
FIGS. 6A-6B are radar plots illustrating the performance of the invention.
Figure 6B:
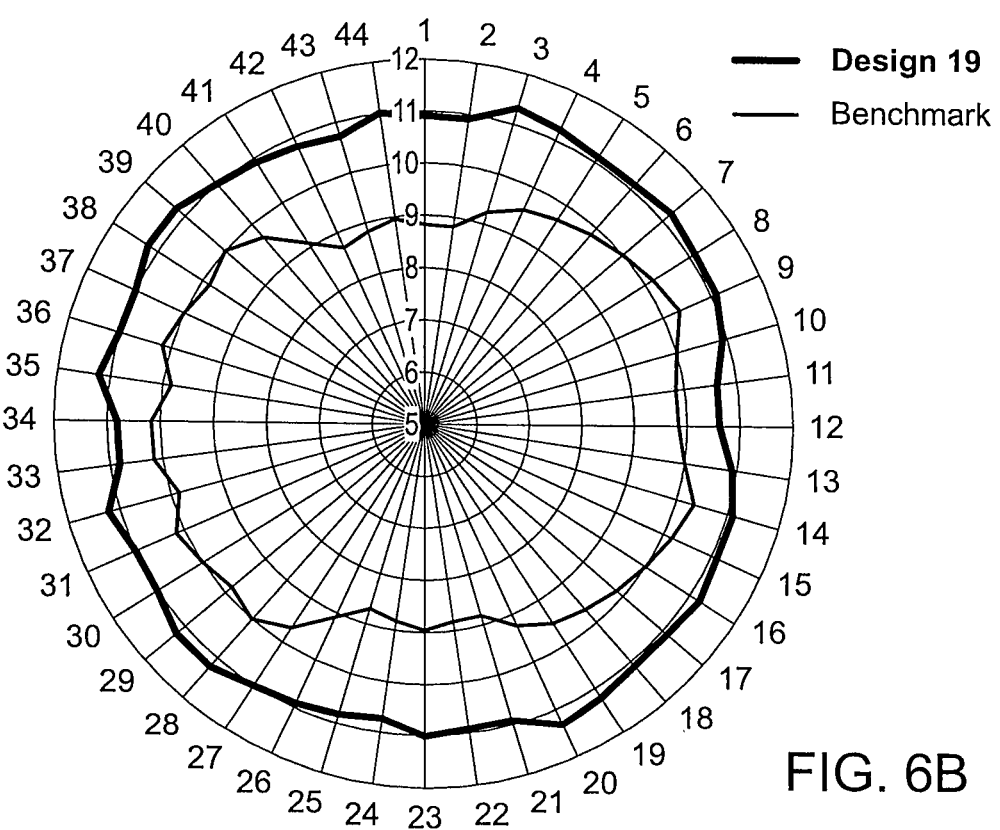

FIGS. 6A-6B are radar plots illustrating the performance of the inventive nozzle arrangement. In particular, the radar plots show the a relative improvement of roughly 10%-20% being possible at the highest cooling rates for 5.5 mm HC products. This equates to roughly 4-8 MPa allowing one to target 30 MPa deviation or +/−15 MPa from the mean value.

The invention provides a flexible nozzle deck for cooling conveyor systems with process optimizations. The nozzle deck includes a number of nozzle structures designed to allow one to infinitely vary the maximum open and closed positions of the nozzle structures so as to control air flow and pressure at the edge region of a conveyor system using a fixed outer jet. Also, the invention provides an adjustable center jet for cooling the central region of a hot rolling mill material. The invention increases cooling efficiency of hot rolling mill material by providing one more access to control the air flow throughout a conveyor system. Furthermore, the invention can be used with a control system to automate the cooling process.

Although the present invention has been shown and described with respect to several preferred embodiments thereof, various changes, omissions and additions to the form and detail thereof, may be made therein, without departing from the spirit and scope of the invention.

What is claimed is:

1. A system for cooling rolling mill material comprising:
   a conveyor system that receives rolling mill material and passes the rolling mill material through one or more cooling regions;
   a cooling structure that operates uniformly across the central and edge regions of the conveyor system, the cooling structure uses a first jet of air for cooling the central portion of the rolling mill material; and
   a nozzle deck that is positioned on the edge regions of the conveyor system and produces a second of jet of air for cooling the edge portions of the rolling mill, the nozzle deck includes one or more adjustable nozzle structures for controlling the air flow produced by the second jet of air by varying the size of their air passage regions, wherein the first jet of air is adjustable using one or more rack and pinions, the rack and pinions comprise wheels that are positioned on a rail on the conveyor system.

2. The system of claim 1, wherein the adjustable nozzle structures adjusts the direction of the air flow to the rolling mill material.

3. The system of claim 1, wherein the adjustable nozzle structures adjusts the pressure of the air flow to the rolling mill material.

4. The system of claim 1, wherein the adjustable nozzle structures vary the size of the air passage regions.

5. The system of claim 1, wherein the conveyor system comprises a fan system to deliver air for cooling purposes.

6. The system of claim 1 further comprising a control system that control air flow and pressure from the first and second jets of air.

7. The system of claim 6, wherein the control system adjusts the size of the air passage of the nozzle structures to control the second jet of air.

8. The system of claim 7, wherein the control system adjusts the movements of the one or more rack and pinions to control the first jet of air.

* * * * *